United States Patent
Krishnamoorthy et al.

(10) Patent No.: US 9,863,852 B2
(45) Date of Patent: Jan. 9, 2018

(54) FAILURE PREDICTION IN A ROTATING DEVICE

(71) Applicant: Marvell World Trade Ltd., St. Michael (BB)

(72) Inventors: Ravishanker Krishnamoorthy, Singapore (SG); Foo Leng Leong, Singapore (SG); Yayue Zhang, Singapore (SG); Edy Susanto, Singapore (SG)

(73) Assignee: Marvell World Trade Ltd., St. Michael (BB)

( * ) Notice: Subject to any disclaimer, the term of this patent is extended or adjusted under 35 U.S.C. 154(b) by 652 days.

(21) Appl. No.: 14/060,361

(22) Filed: Oct. 22, 2013

(65) Prior Publication Data

US 2014/0111218 A1     Apr. 24, 2014

Related U.S. Application Data

(60) Provisional application No. 61/717,866, filed on Oct. 24, 2012.

(51) Int. Cl.
*G01M 99/00* (2011.01)
*F04D 27/00* (2006.01)
(Continued)

(52) U.S. Cl.
CPC .......... *G01M 99/00* (2013.01); *F04D 27/001* (2013.01); *H02H 7/085* (2013.01); *H02H 7/0844* (2013.01)

(58) Field of Classification Search
CPC .... G05B 21/02; G05B 13/00; G05B 23/0275; G01R 31/003; G01R 31/006; G01R 31/34; G01R 31/343; G01R 31/346; G01R 17/02; G01R 19/10; G01R 19/0084; G01R 19/0092; G01R 19/0038; G01R 19/003; G01R 31/00; G01R 31/40; G01R 31/42; G01R 19/16571; H02H 7/00844; H02H 7/085; H02H 7/0805–7/0859;
(Continued)

(56) References Cited

U.S. PATENT DOCUMENTS 4,965,513 A * 10/1990 Haynes et al. ................. 73/1.72
5,754,450 A *  5/1998 Solomon et al. ............... 702/35
(Continued)

FOREIGN PATENT DOCUMENTS

| FR | 2941140 A1 | 7/2010 |
|---|---|---|
| JP | H05118289 A | 5/1993 |
| JP | 2003232292 A | 8/2003 |

OTHER PUBLICATIONS

The PCT Search Report and Written Opinion dated Apr. 4, 2014 for PCT application No. PCT/IB2013/002374, 12 pages.

*Primary Examiner* — Patrick Assouad
*Assistant Examiner* — Khristopher Yodichkas

(57) ABSTRACT

Some of the embodiments provide a method comprising: during an operation phase, operating a rotating device at a first speed; during the operation phase, monitoring a first current consumed by the rotating device to operate at the first speed; comparing the first current to a second current measured during a calibration phase while rotating the device at a second speed, wherein the first speed is substantially equal to the second speed; and based on comparing the first current and the second current, predicting a possible failure of the rotating device.

13 Claims, 3 Drawing Sheets

(51) Int. Cl.
*H02H 7/08* (2006.01)
*H02H 7/085* (2006.01)

(58) Field of Classification Search
CPC .......... F04D 27/001; G01P 3/565; G01P 3/58; G01P 3/60; H02P 6/001; H02P 6/08; H02P 6/20
See application file for complete search history.

(56) References Cited

U.S. PATENT DOCUMENTS

| | | | |
|---|---|---|---|
| 6,831,477 B2* | 12/2004 | Fukusumi et al. | 324/765.01 |
| 2004/0044499 A1* | 3/2004 | House et al. | 702/181 |
| 2006/0176186 A1* | 8/2006 | Larson et al. | 340/635 |
| 2009/0035151 A1 | 2/2009 | Sugiura et al. | |
| 2009/0115620 A1* | 5/2009 | Hunter et al. | 340/664 |
| 2009/0252617 A1 | 10/2009 | Mertens et al. | |
| 2010/0256821 A1* | 10/2010 | Jeung et al. | 700/276 |
| 2011/0181216 A1* | 7/2011 | Bass et al. | 318/400.11 |

* cited by examiner

FAILURE PREDICTION IN A ROTATING DEVICE

CROSS REFERENCE TO RELATED APPLICATIONS

The present disclosure claims priority to U.S. Provisional Patent Application No. 61/717,866, filed Oct. 24, 2012, which is incorporated herein by reference in its entirety.

TECHNICAL FIELD

Embodiments of the present disclosure relate to rotating devices, and more particularly, to failure in rotating devices.

BACKGROUND

Unless otherwise indicated herein, the approaches described in this section are not prior art to the claims in the present disclosure and are not admitted to be prior art by inclusion in this section.

Fans are often used in a variety of systems and for a variety of purposes (e.g., for cooling an electronic system, for cooling a computer, etc.). A fan may fail for many reasons, e.g., due to a failure in a bearing that is used to mount the fan, dust or debris accumulating in an airflow path of the fan, etc. A failure of the fan (e.g., when the fan stops rotating) can be detected using, for example, a speed sensor that monitors a speed of rotation of the fan.

SUMMARY

In various embodiments, the present disclosure provides a method comprising: during an operation phase, operating a rotating device at a first speed; during the operation phase, monitoring a first current consumed by the rotating device to operate at the first speed; comparing the first current to a second current measured during a calibration phase while rotating the device at a second speed, wherein the first speed is substantially equal to the second speed; and based on comparing the first current and the second current, predicting a possible failure of the rotating device. In an embodiment, predicting the possible failure of the rotating device further comprises: in response to the first current being higher than the second current by a threshold percentage, predicting the possible failure of the rotating device. In an embodiment, predicting the possible failure of the rotating device further comprises: in response to the first current being higher than the second current by the threshold percentage for at least a threshold period of time, predicting the possible failure of the rotating device. The rotating device operates in the calibration phase during manufacturing or servicing the rotating device. Monitoring the first current consumed by the rotating device to operate at the first speed further comprises: during the operation phase, monitoring the first current at periodic intervals. Monitoring the first current consumed by the rotating device to operate at the first speed further comprises: during the operation phase, monitoring the first current during a start up of the rotating device. In an embodiment, the method further comprises: during the calibration phase, operating the rotating device at the second speed; and during the calibration phase, measuring the second current consumed by the rotating device to operate at the second speed. In an embodiment, the method further comprises subsequent to measuring the second current, storing a value of the first current in a memory.

In various embodiments, the present disclosure provides a system comprising: a rotating device; a speed control module configured to, during an operation phase, control the rotating device such that the rotating device operates at a first speed; and a failure prediction module configured to: during the operation phase, monitor a first current consumed by the rotating device to operate at the first speed, compare the first current and a second current measured during a calibration phase while rotating the device at a second speed, wherein the first speed is substantially equal to the second speed, and based on comparing the first current and the second current, predict a possible failure of the rotating device. The failure prediction module is further configured to: in response to the first current being higher than the second current by a threshold percentage, predict the possible failure of the rotating device. The rotating device operates in the calibration phase during manufacturing or servicing the rotating device. The failure prediction module is further configured to: during the operation phase, monitor the first current at periodic intervals. The failure prediction module is further configured to: during the operation phase, monitor the first current during a start up of the rotating device. The speed control module is further configured to, during the calibration operation phase, control the rotating device such that the rotating device operates at the second speed; and the failure prediction module is further configured to, during the calibration phase, monitor the second current consumed by the rotating device to operate at the second speed. The system further comprises: a memory configured to store a value of the second current. In an embodiment, the rotating device is a fan.

BRIEF DESCRIPTION OF THE DRAWINGS

In the following detailed description, reference is made to the accompanying drawings which form a part hereof wherein like numerals designate like parts throughout, and in which is shown by way of embodiments that illustrate principles of the present disclosure. It is to be understood that other embodiments may be utilized and structural or logical changes may be made without departing from the scope of the present disclosure. Therefore, the following detailed description is not to be taken in a limiting sense, and the scope of embodiments in accordance with the present disclosure is defined by the appended claims and their equivalents.

DETAILED DESCRIPTION

Figure 1:
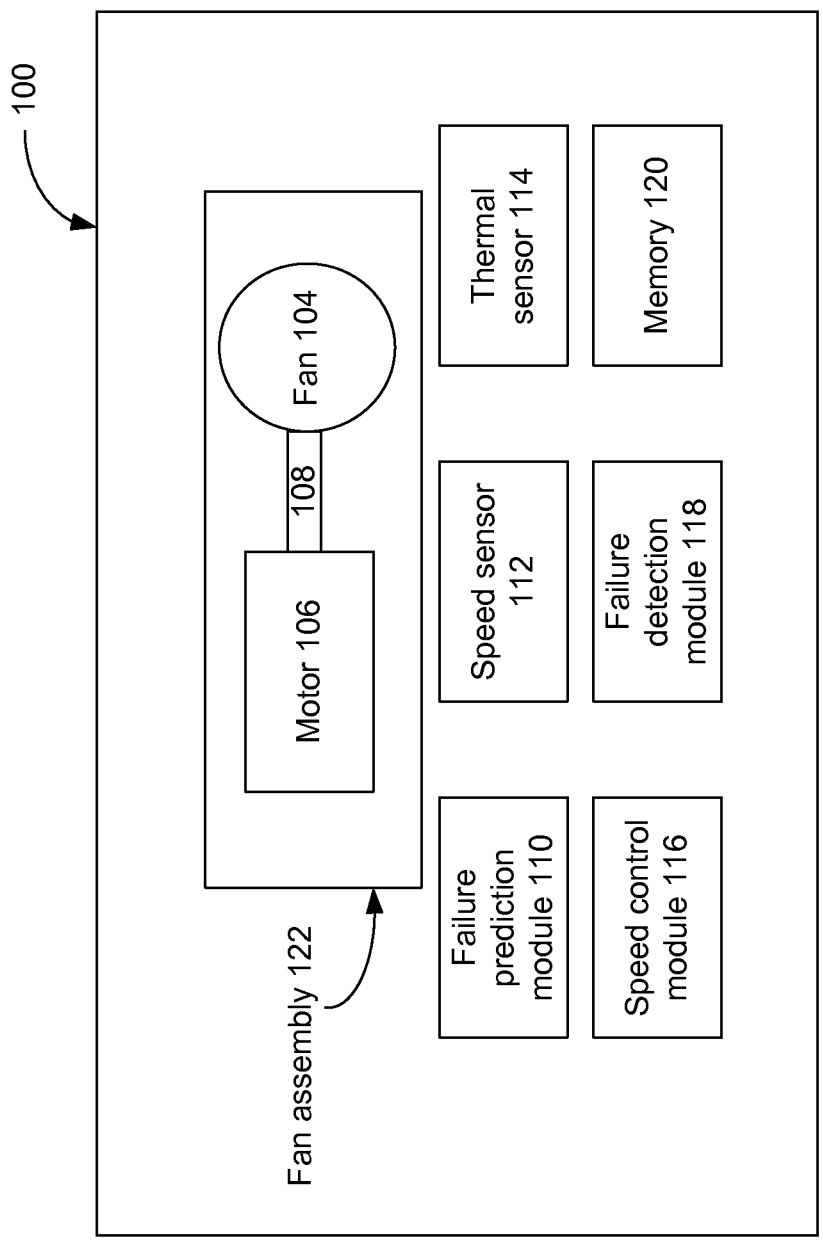
FIG. 1 schematically illustrates a system for operating a fan, and selectively predicting a possible failure of the fan.

FIG. 1 schematically illustrates a system 100 for operating a fan 104, and selectively predicting a possible failure of the fan 104. The system 100 comprises a motor 106 coupled to the fan 104 through a shaft 108. The motor 106 is configured to drive the fan 104 through the shaft 108. Although not illustrated in FIG. 1, the fan 104 comprises a plurality of blades, which rotates with the rotation of the motor 106, thereby generating an air flow in the vicinity of the fan 104. In an embodiment, the motor 106, the shaft 108 and the fan 104 are housed in a single housing, and/or are combined to form a single component of the system 100. In FIG. 1, the motor 106, the shaft 108, the fan 104 and any other associated mechanical arrangements (e.g., which are used to drive the fan 104 and the motor 106) are referred to as a fan assembly 122.

It is to be noted that although, as an example, some of the embodiments of this disclosure are directed towards predicting failure in the fan assembly 122, the principles of this disclosure can be applied to predicting failure in any appropriate rotating device (e.g., any rotating device that rotates using electric power). For example, the principles of this disclosure can be applied to predicting failure in a disc drive system (e.g., in which a magnetic disc is rotated), a system that has one or more wheels being rotated by an electric motor, and/or the like.

In an embodiment, the fan assembly 122 is used for any appropriate purpose. For example, the fan assembly 122 can be used for cooling an electrical, electronic and/or mechanical system (e.g., for cooling a computing device, base station equipments mounted a cell phone tower, and/or the like), cooling a room, etc.

The system 100 further comprises one or more speed sensors 112 to measure a speed at which the fan 104 rotates. In an example, the speed sensor 112 comprises one or more hall effect sensors to measure the speed at which the fan 104 rotates, although any other appropriate speed measurement sensor can also be used.

The system 100 further comprises one or more thermal sensors 114 to measure a temperature of one or more locations within the system 100, or external to the system 100. In an example, the thermal sensor 114 measures a temperature of an electronic device that is cooled by the system 100, e.g., cooled by the fan 104 (e.g., in such an example, the thermal sensor 114 may be located outside the system 100). Additionally or alternatively, the thermal sensor 114 measures a temperature of one or more components within the system 100, e.g., the temperature of the motor 106 and/or the fan 104 (e.g., in order to prevent over-heating of the motor 106 and/or the fan 104).

The system 100 further comprises a speed control module 116 configured to control or regulate a speed of the fan 104. Based on output of the speed sensor 112, the thermal sensor 114 and/or other input received from a user of the system 100, the speed control module 116 controls the speed of the fan 104 (e.g., by controlling the motor 106). In an example, the speed control module 116 can dynamically vary the speed of the fan 104, in order to regulate a temperature of an electronic system that is cooled by the fan 104 (e.g. maintain the temperature at substantially a constant level). In another example, the speed control module 116 is configured to run the fan 104 at a constant speed.

The system 100 further comprises a failure detection module 118 configured to detect a fault or a failure of the fan assembly 122 and/or of any other component of the system 100. As an example, the failure detection module 118 receives an output from the speed sensor 112. If the fan 104 and/or the motor 106 fails to start, stops for some reason, and/or runs at a speed that is different from a speed at which the fan 104 and/or the motor 106 is configured to be run by the speed control module 116, the failure detection module 118 detects such an event using the output of the speed sensor 112. Based on detecting such an event, the failure detection module 118 detects a fault or a failure of the fan assembly 122. In another example, the failure detection module 118 can also detect a fault in the system 100 by any other appropriate manner (e.g., by detecting overheating of one or more components of the system 100, using an output of the thermal sensor 114). In an embodiment, the failure detection module 118 detects a fault in the system 100 only after the fault has occurred in the system 100, and has limited capability in predicting a possible failure in the system 100.

The system 100 further comprises a memory 120, which may be configured to store instructions that, if executed, result in operations of one or more components (e.g., the failure prediction module 110, the speed control module 116, the failure detection module 118, and/or the like) of the system 100. The memory 120 stores various information for use by one or more modules of the system 100, as will be discussed in more detail herein.

In an embodiment, the fan 104, the shaft 108 and the motor 106 are coupled to each other via a mechanical arrangement (not illustrated in FIG. 1) comprising, for example, bearings, gears, and/or the like. Such a mechanical arrangement is used to mount and rotate various components of the fan assembly 122. Usually, the mechanical arrangement undergoes wear and tear, as the fan assembly 122 is used over an extended period of time, leading to potential eventual failure of one or more components of the mechanical arrangement. For example, the bearings of the mechanical arrangement can develop cracks, and eventually fail over time. Generally, the failure of the mechanical arrangement is not a sudden event, and happens gradually with time (although in some situations, such a failure may occur suddenly, without any initial wear and tear of the mechanical arrangement).

The wear and tear of the mechanical arrangement increases a friction that the motor 106 and/or the fan 104 have to encounter to rotate. When the mechanical arrangement eventually fails, the motor 106 and/or the fan 104 may stop running. In an embodiment, with the wear and tear of the mechanical arrangement in the fan assembly 122, a current required to operate the motor 106 at a given speed increases (e.g., because of the increase in the friction with the wear and tear of the mechanical arrangement).

For example, when the bearings in the mechanical arrangement work as intended (e.g., immediately after installing and/or replacing the bearings), a nominal current In is required to operate the motor 106 and/or the fan 104 at a given speed. If the bearings start to develop a fault (i.e., wears and tears by, for example, developing a crack in the bearings), the current required to operate the motor 106 and/or the fan 104 at the given speed increases (e.g., because of the increased friction caused by the faulty bearing), and is higher than the nominal current In. If the bearing eventually fails, the motor 106 and/or the fan 104 fail to operate at the given speed.

Failure of the motor 106 and/or the fan 104 may also be caused due to various other reasons, e.g., due to accumulation of dust and/or other debris in an airflow path of the fan 104. Failure due to accumulation of dust and/or other debris is also gradual in nature. That is, usually, dust and/or other debris accumulates gradually over time, and a current required to operate the motor 106 and/or the fan 104 at a given speed increases with such dust and/or other debris accumulation. When a level of the accumulated dust and/or other debris is very high (e.g., higher than a threshold level), the motor 106 and/or the fan 104 fail to operate at the given speed.

In an embodiment, the system 100 comprises a failure prediction module 110 configured to selectively predict a possible failure of the fan assembly 122. In an embodiment, the failure prediction module 110 monitors a current level used by the motor 106 to operate the fan 104 at a given speed. Based on monitoring the current level, the failure prediction module 110 predicts a possible failure of the fan 104.

Figure 2:
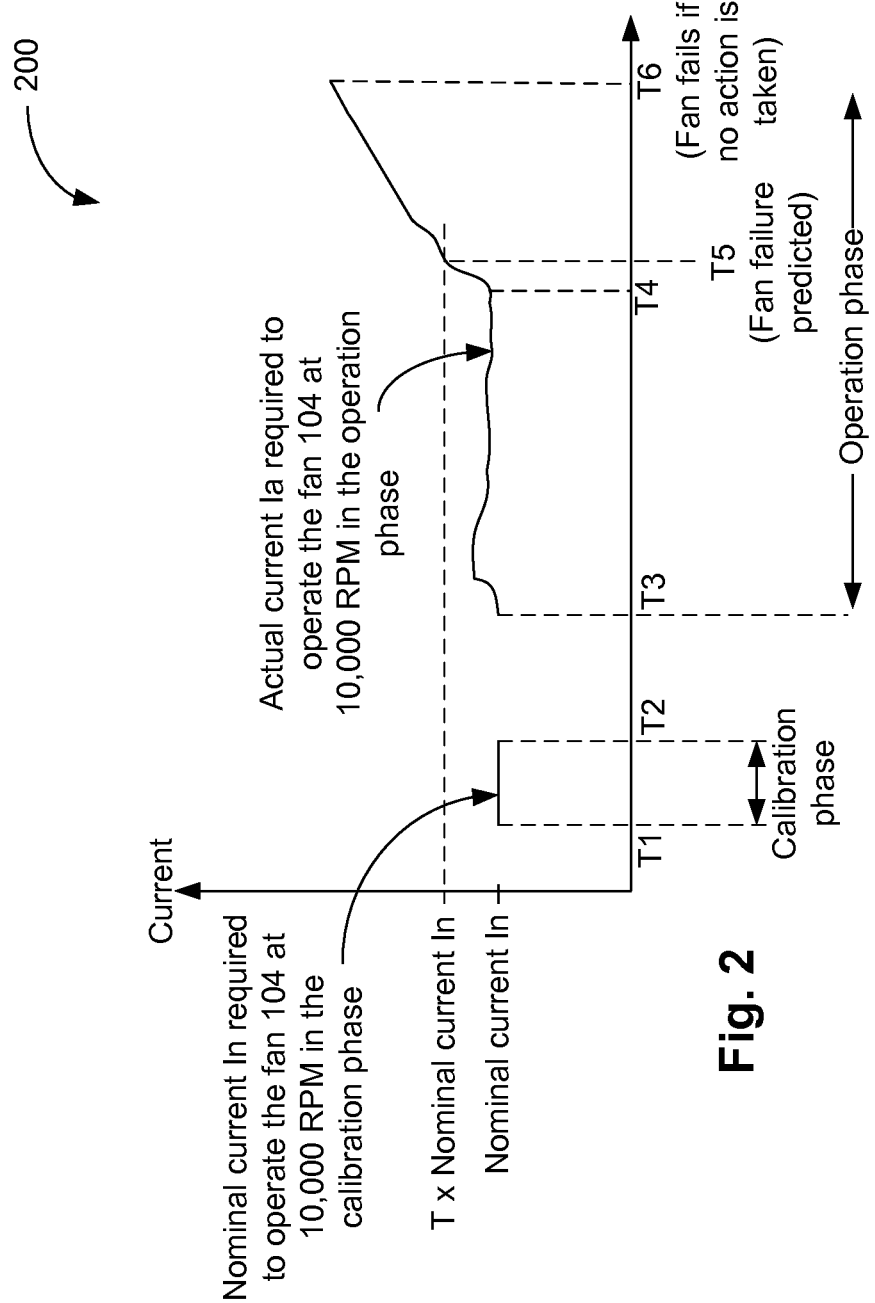
FIG. 2 illustrates a graph including example variations of a current used to drive a fan assembly at a given speed during a calibration phase and an operation phase.

In an embodiment, the system 100 operates in a calibration phase and an operation phase. FIG. 2 illustrates a graph 200 including example variations of a current used to drive the motor 106 at a given speed during the calibration phase and the operation phase of the system 100.

During the calibration phase, the system 100 (e.g., the fan assembly 122, including the motor 106, the shaft 108 and/or the fan 104) is known to operate without any fault or failure in the fan assembly 122. The calibration phase occurs, for example, during or immediately after manufacturing the fan assembly 122, after servicing the fan assembly 122 (e.g., after checking and possibly replacing at least some of the bearings of the fan assembly 122), and/or the like.

In an embodiment, during the calibration phase, current required to operate the fan 104 at various speed levels (e.g., those speed levels in which the fan would normally operate in the operation phase) are measured. As an example, during the calibration phase, current required to operate the fan 104 at 10,000 revolutions per minute (i.e., 10,000 RPM, which, for example, may be a nominal speed of the fan 104) is measured, which is referred to herein as nominal current In. For example, referring to FIG. 2, a time period between time T1 and T2 denotes the calibration phase of the system 100. During the calibration phase, the current required to operate the fan 104 at 10,000 RPM is illustrated as the nominal current In in the graph 200. In an embodiment, a value of the nominal current In is stored in the memory 120.

It is to be noted that the 10,000 RPM speed of the fan 104 is used merely as an example, and one or more other RPM values of the fan 104 may be used instead. For example, in an embodiment, during the calibration phase, currents required to operate the fan 104 at each of 5000 RPM, 6000 RPM, . . . , 12,000 RPM (or any other appropriate RPM values) may also be measured and stored in the memory 120.

The operation phase of the system 100 refers to a regular or normal operation of the system 100 (e.g., when the fan 104 is used for cooling purposes). Assume, for example, that during at least a part of the operation phase of the system 100, the fan 104 is rotated at 10,000 RPM. A current required by the motor 106 to drive the fan 104 at 10,000 RPM during the operation phase is denoted herein as actual current Ia. In FIG. 2, the operation phase starts from time T3. FIG. 2 illustrates a variation of the actual current Ia during the operation phase of the system 100. It is to be noted that the variation of the actual current Ia illustrated in FIG. 2 is merely an example.

In an embodiment, if no fault has developed in the fan assembly 122 (e.g., if the bearings in the fan assembly 122 are working as intended, if dust and/or debris accumulation is below a permissible level, and/or the like), then the actual current Ia has a similar, or almost similar value compared to the value of the nominal current In. For example, if no fault has developed in the fan assembly 122, then the actual current Ia is within a threshold percentage of the nominal current In (e.g., the actual current Ia is ±50% of the nominal current In). For example, between time T3 and time T4 in FIG. 2, when no fault has developed in the fan assembly 122, the actual current Ia is illustrated to be very close to the nominal current In.

However, as and when a fault starts developing in the fan assembly 122, the actual current Ia increases. For example, if a bearing of the fan assembly 122 develops a fault, the faulty bearing generates friction against the rotation of one or more components within the fan assembly 122, and an increase in the actual current Ia is required to counter the friction while rotating the fan 104 at 10,000 RPM. In another embodiment, the fault is developed due to increase in dust and/or other debris accumulation in the fan assembly 122, or in the airflow path of the fan 104. For example, at or around time T4 in FIG. 2, a fault develops in the fan assembly 122. Accordingly, the actual current Ia starts increasing from at or around time T4, as illustrated in FIG. 2.

If no action is taken to rectify the developed fault, the fan assembly 122 will eventually fail at, for example, time T6, as illustrated in FIG. 2. For example, at time T6, the fan 104 will stop rotating, or will start rotating at a reduced speed (e.g., compared to a desired speed provided by the speed control module 116 to the fan assembly 122). Such a failure can be detected by the failure detection module 118 (e.g., using the output of the speed sensor 112). However, the failure detection module 118 can detect the failure at time T6, i.e., after the fan 104 has already failed.

In an embodiment, prior to the actual failure of the fan assembly 122 at time T6, the failure prediction module 110 predicts a possible failure of the fan assembly 122 at time T5. In an embodiment, the failure prediction module 110 continuously or periodically (e.g., at every few seconds, few minutes, few hours, after every start up of the fan 104, etc.) monitors the actual current Ia, and compares the actual current Ia and the nominal current In. When the actual current Ia exceeds the nominal current In by a threshold percentage T, the failure prediction module 110 predicts a possible failure of the fan assembly 122. For example, at time T5, the actual current Ia exceeds the nominal current In by the threshold percentage T, based on which at time T5 the failure prediction module 110 predicts a possible failure of the fan assembly 122. In an embodiment, predicting a possible failure of the fan assembly 122 comprises predicting a high probability of imminent failure of the fan assembly 122 (e.g., high probability of failure of the fan assembly 122 in near future).

The threshold percentage T is, merely as an example, 150%. Accordingly, if the nominal current is 2 amperes, the failure prediction module 110 predicts the possible failure of the fan assembly 122 when the actual current Ia exceeds 3 amperes.

In an embodiment, the failure prediction module 110 predicts the possible failure of the fan assembly 122 if the actual current Ia exceeds the nominal current In by the threshold percentage T for at least a threshold period of time (which may be, for example, at least a few seconds). Using the threshold period of time avoids false prediction due to, for example, a momentary spike in the actual current Ia during, for example, start up of the motor 106.

Once the failure prediction module 110 predicts the possible failure of the fan assembly 122, various corrective measures may be taken. For example, the bearings of the fan assembly 122 may be checked and possibly replaced, dust and debris accumulation near the fan assembly 122 may be removed, and/or the like. Such corrective measures may prevent the eventual failure of the fan assembly 122.

Without the failure prediction module 110, the failure of the fan assembly 122 is detected (e.g., by the failure detection module 118) only after the fan assembly 122 has actually failed. However, the failure prediction provided by the failure prediction module 110 results in timely corrective actions, thereby preventing actual failure of the fan assembly 122.

Figure 3:
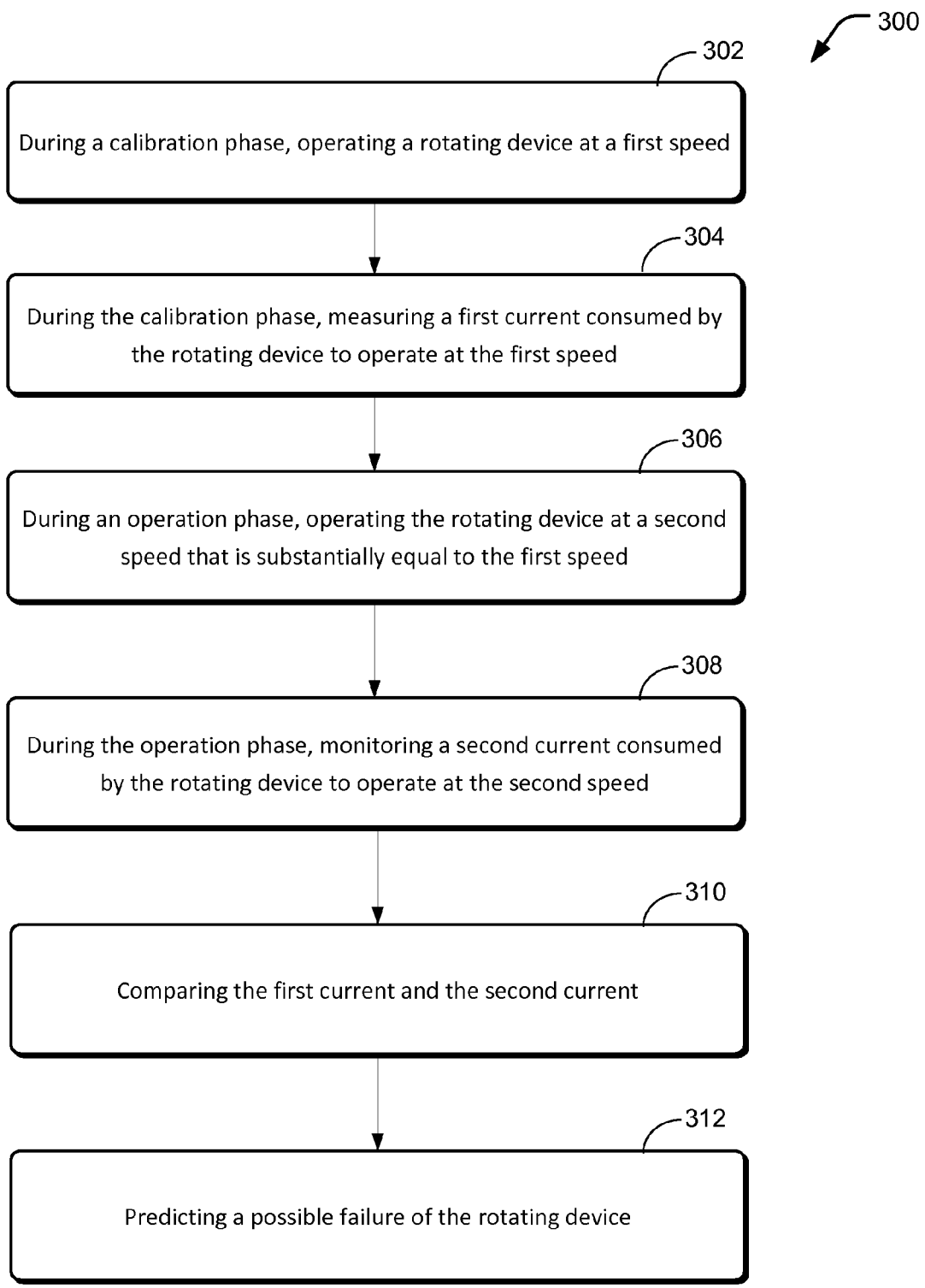
FIG. 3 illustrates an example method for predicting a failure of a rotating device, while operating the rotating device.

FIG. 3 illustrates an example method 300 for predicting a failure of a rotating device (e.g., the fan 104 of FIG. 1) while operating the rotating device. At 302, during a calibration phase of the rotating device, the rotating device is operated at a first speed (e.g., at a nominal speed of the rotating device, which is, for example, 10,000 RPM). At 304, during the calibration phase, a first current (e.g., the nominal current In) consumed by the rotating device to operate at the first speed is measured. In an embodiment, a value of the first current is stored in a memory (e.g., memory 120 of FIG. 1).

At 306, during an operation phase, the rotating device is operated at a second speed that is substantially equal to the first speed. For example, a speed control module (e.g., the speed control module 116 of FIG. 1) controls the speed of the rotating device such that the rotating device operates at the second speed that is substantially equal to the first speed. At 308, during the operation phase, a second current (e.g., the actual current Ia) consumed by the rotating device to operate at the second speed is monitored (e.g., by the failure prediction module 110). At 310, the first current is compared (e.g., by the failure prediction module 110) with the second current. At 312, based on comparing the first current and the second current, a possible failure of the rotating device is predicted (e.g., by the failure prediction module 110). For example, based on the second current being higher than the first current by a threshold percentage (and for at least a threshold period of time), the possible failure of the rotating device is predicted.

In accordance with various embodiments, an article of manufacture may be provided that includes a storage medium having instructions stored thereon that, if executed, result in the operations described herein with respect to the method 300 of FIG. 3 (and/or various other operations discussed in the present disclosure). In an embodiment, the storage medium comprises some type of non-transitory memory (e.g., memory 120). In accordance with various embodiments, the article of manufacture may be a computer-readable medium such as, for example, software or firmware.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

The description incorporates use of the phrases "in an embodiment," or "in various embodiments," which may each refer to one or more of the same or different embodiments. Furthermore, the terms "comprising," "including," "having," and the like, as used with respect to embodiments of the present disclosure, are synonymous.

Various operations may have been described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

Although specific embodiments have been illustrated and described herein, it is noted that a wide variety of alternate and/or equivalent implementations may be substituted for the specific embodiment shown and described without departing from the scope of the present disclosure. The present disclosure covers all methods, apparatus, and articles of manufacture fairly falling within the scope of the appended claims either literally or under the doctrine of equivalents. This application is intended to cover any adaptations or variations of the embodiment disclosed herein. Therefore, it is manifested and intended that the present disclosure be limited only by the claims and the equivalents thereof.

What is claimed is:

1. A method comprising:
   during an operation phase, operating a rotating device at a first speed;
   during the operation phase, monitoring a first current consumed by the rotating device to operate at the first speed, wherein during a calibration phase, the rotating device is operated at a second speed and a third speed, wherein while the rotating device is operated at the second speed during the calibration phase, a second current is measured to be consumed by the rotating device, and wherein while the rotating device is operated at the third speed during the calibration phase, a third current is measured to be consumed by the rotating device;
   determining that the first speed is substantially equal to the second speed;
   in response to determining that the first speed is substantially equal to the second speed, comparing the first current to the second current; and
   based on comparing the first current and the second current, predicting a possible failure of the rotating device.

2. The method of claim 1, wherein predicting the possible failure of the rotating device further comprises:
   in response to the first current being higher than the second current by a threshold percentage, predicting the possible failure of the rotating device.

3. The method of claim 1, wherein monitoring the first current consumed by the rotating device to operate at the first speed further comprises:
   during the operation phase, monitoring the first current at periodic intervals.

4. The method of claim 1, wherein monitoring the first current consumed by the rotating device to operate at the first speed further comprises:
   during the operation phase, monitoring the first current during a start up of the rotating device.

5. The method of claim 1, wherein the possible failure of the rotating device is due to a fault in a mechanical arrangement used to rotate the rotating device.

6. The method of claim 1, wherein the possible failure of the rotating device is due to accumulation of dust or other debris in a path of an air flow that is generated based on the rotation of the rotating device.

7. A system comprising:
   a rotating device;
   a speed control module configured to, during an operation phase, control the rotating device such that the rotating device operates at a first speed; and
   a failure prediction module configured to
      during the operation phase, monitor a first current consumed by the rotating device to operate at the first speed,
      during a calibration phase, monitor (i) a second current consumed by the rotating device to operate at a second speed and (ii) a third current consumed by the rotating device to operate at a third speed,
      determine that the first speed is substantially equal to the second speed, in response to determining that the first speed is substantially equal to the second speed, compare the first current and the second current, and based on comparing the first current and the second current, predict a possible failure of the rotating device.

8. The system of claim 7, wherein the failure prediction module is further configured to:

in response to the first current being higher than the second current by a threshold percentage, predict the possible failure of the rotating device.

9. The system of claim 7, wherein the failure prediction module is further configured to:

during the operation phase, monitor the first current at periodic intervals.

10. The system of claim 7, wherein the failure prediction module is further configured to:

during the operation phase, monitor the first current during a start up of the rotating device.

11. The system of claim 7, wherein the possible failure of the rotating device is due to a fault in a mechanical arrangement used to rotate the rotating device.

12. The system of claim 7, wherein the possible failure of the rotating device is due to accumulation of dust or other debris in a path of an air flow that is generated based on the rotation of the rotating device.

13. The system of claim 7, wherein the rotating device is a fan.

* * * * *